United States Patent

Suzumura et al.

Patent Number: 5,125,490
Date of Patent: Jun. 30, 1992

[54] CENTER DIFFERENTIAL LOCK MECHANISM CONTROLLING DEVICE

[75] Inventors: Nobuyasu Suzumura; Nobuyuki Isono, both of Aichi, Japan

[73] Assignee: Aisin Seiki K.K., Aichi, Japan

[21] Appl. No.: 734,124

[22] Filed: Jul. 25, 1991

Related U.S. Application Data

[63] Continuation of Ser. No. 471,348, Jan. 29, 1990, abandoned.

[30] Foreign Application Priority Data

Jan. 27, 1989 [JP] Japan .................................. 1-18917

[51] Int. Cl.[5] ...................... B60K 17/35; B60K 41/04; F16H 1/44
[52] U.S. Cl. ..................................... 192/0.07; 475/86; 180/249
[58] Field of Search ............ 192/0.055, 0.07, 0.09, 192/0.094; 475/86, 150; 180/244, 249

[56] References Cited

U.S. PATENT DOCUMENTS

| | | | |
|---|---|---|---|
| 4,751,856 | 6/1988 | Nakamura et al. | 475/86 X |
| 4,753,131 | 6/1988 | Wupper | 475/86 |
| 4,754,836 | 7/1988 | Harada et al. | 180/249 |
| 4,787,471 | 11/1988 | Kobayashi | 180/249 |
| 4,934,497 | 6/1990 | Ishizeki et al. | 192/13 R |
| 4,936,406 | 6/1990 | Tezuka et al. | 180/249 |

FOREIGN PATENT DOCUMENTS 1-83418 3/1989 Japan .................................. 180/244

*Primary Examiner*—Richard Lorence
*Attorney, Agent, or Firm*—Sughrue, Mion, Zinn, Macpeak & Seas

[57] ABSTRACT

In a four wheel drive vehicle having an anti-lock brake system in combination with a front differential gear, a rear differential gear and a center differential gear, a center differential lock mechanism between the front differential gear and the center differential gear is automatically disengaged when a throttle opening sensor detects a low degree of throttle opening independently of the vehicle speed. The device for automatically disengaging the center differential lock mechanism is operated under the control of an operating unit receiving input signals from a center differential gear operating switch, a vehicle speed sensor, a rear wheel speed sensor, a brake lamp sensor and a throttle opening sensor.

6 Claims, 4 Drawing Sheets

CENTER DIFFERENTIAL LOCK MECHANISM CONTROLLING DEVICE

This is a continuation of application Ser. No. 07/471,348 filed Jan. 29, 1990.

BACKGROUND OF THE INVENTION

The present invention relates generally to a controlling system for a center differential lock mechanism with an anti-lock brake system. More particularly, the present invention is concerned with a system for controlling a center differential lock mechanism in accordance with the operating condition of a throttle valve and an anti-lock brake system.

An example of a prior art control method for all-wheel driven vehicle is disclosed in U.S. Pat. No. 4,753,131 patented on Jun. 7, 1988. The vehicle comprises a drive unit, a transmission gear, a front axle-differential, a rear-axle differential and an intermediate differential. The torque of the drive unit is transmitted by way of the transmission gear to the intermediate differential. Driving shafts are operatively connected to the intermediate differential. An operating cylinder is arranged between the intermediate differential and the rear-axle differential. The intermediate differential and the rear-axle differential are provided for differential locks. The differential lock which is provided for the intermediate differential controls the transmission of the torque for the driving shafts. The differential lock which is equipped with the rear-axle differential controls the transmission of torque for rear output shafts. Two rear wheels are connected to the rear output shafts. The slip-controlled brake system includes a pedal actuated three-circuit braking pressure generator with a hydraulic energy supply and with a hydraulic accumulator. Two front wheels are connected to the front-axle shaft by way of semi-axles. The front wheels are in hydraulic communication with separate first and second brake circuits, while the rear wheels are connected jointly to the third brake circuit.

The rotational speeds of the wheels will be determined by wheel rotational sensors in the form of electric signals which are supplied to a slip control unit or to an electric circuit. Upon commencement of brake slip control or upon recognition of a locked condition braking is ensured by corresponding logic in the electric circuit.

In this related art, the slip-controlled brake system is operated in accordance with the depressing of a brake pedal. The intermediate differential is simultaneously controlled at the beginning of the depressing of the brake pedal. Based on the above mentioned controlling operation, the response time of the intermediate differential is slow. This is a problem for the controlling of the intermediate differential operation.

SUMMARY OF THE INVENTION

It is a primary object of the present invention to produce a four wheel drive controlled vehicle which is equipped with a hydraulic controlled center differential lock mechanism.

It is another object of the present invention to produce a control method for a four wheel drive vehicle which is equipped with a center differential lock mechanism and an anti-lock brake system which prevents a locked state of the wheels.

It is a further object of the present invention to provide a control method for a four wheel drive vehicle which prevents the engagement of the center differential lock mechanism under braking conditions.

These objects and advantages are achieved, for example, by providing a center differential lock mechanism controlling system and an anti-lock brake system for a vehicle with four wheel drive which is equipped with a front differential gear, a rear differential gear and a center differential gear, a center differential lock mechanism between the front differential gear and the center differential gear, an anti-lock brake controlling unit for controlling braking of the vehicle upon the occurrence of an imminent locked condition, a center differential gear operating unit controlling engaging and/or disengaging the differential lock mechanism, a throttle opening sensor detecting the opening of a throttle valve; the center differential gear operating unit includes means for automatically disengaging the center differential lock when the throttle opening sensor detects a low degree of throttle opening.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
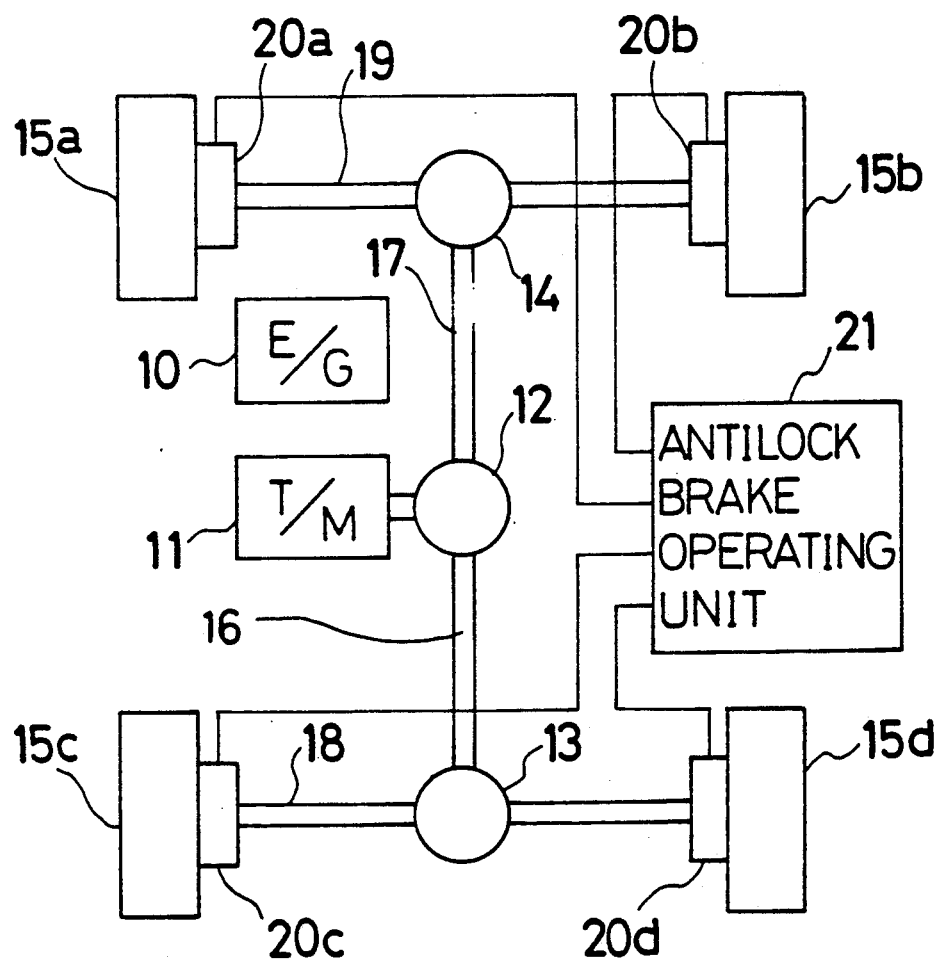
FIG. 1 is a diagram of a system according to the present invention.

Referring to FIG. 1, a four wheel drive vehicle includes an internal combustion engine or torque generating drive unit 10, a transmission 11, center differential gear 12, a front differential gear 13, a rear differential gear 14 and four wheels 15a through 15d. The torque of the drive unit 10 is transmitted by way of the transmission gear 11 to the center differential gear 12. The torque of the center differential gear 12 is transmitted by way of driving shafts 16, 17 to the front and rear differential gears 13, 14. A front axle-shaft 18 is connected to the front differential gear 13, and a rear axle-shaft 19 is connected to the rear differential gear 14.

Wheel brake devices 20a through 20d are mounted on wheels 15a through 15d, respectively. Hydraulic pressure conduits (not shown) are connected to the wheel brake devices 20a through 20d. An antilock brake operating unit 21 is arranged on the four wheel drive vehicle. The wheel brake devices are controlled in accordance with an electric control signal which is calculated by the anti-lock brake operating unit 21 to provide the desired braking condition. Electric lines are provided between the anti-lock brake operating unit 21 and wheel brake devices 20a through 20d. The anti-lock brake operating unit 21 produces the most suitable slip rate between the wheel and the ground surface. A center differential lock mechanism 30 (shown in FIG. 2) is arranged between the center differential gear 12 and the front differential gear 13.

Figure 2:
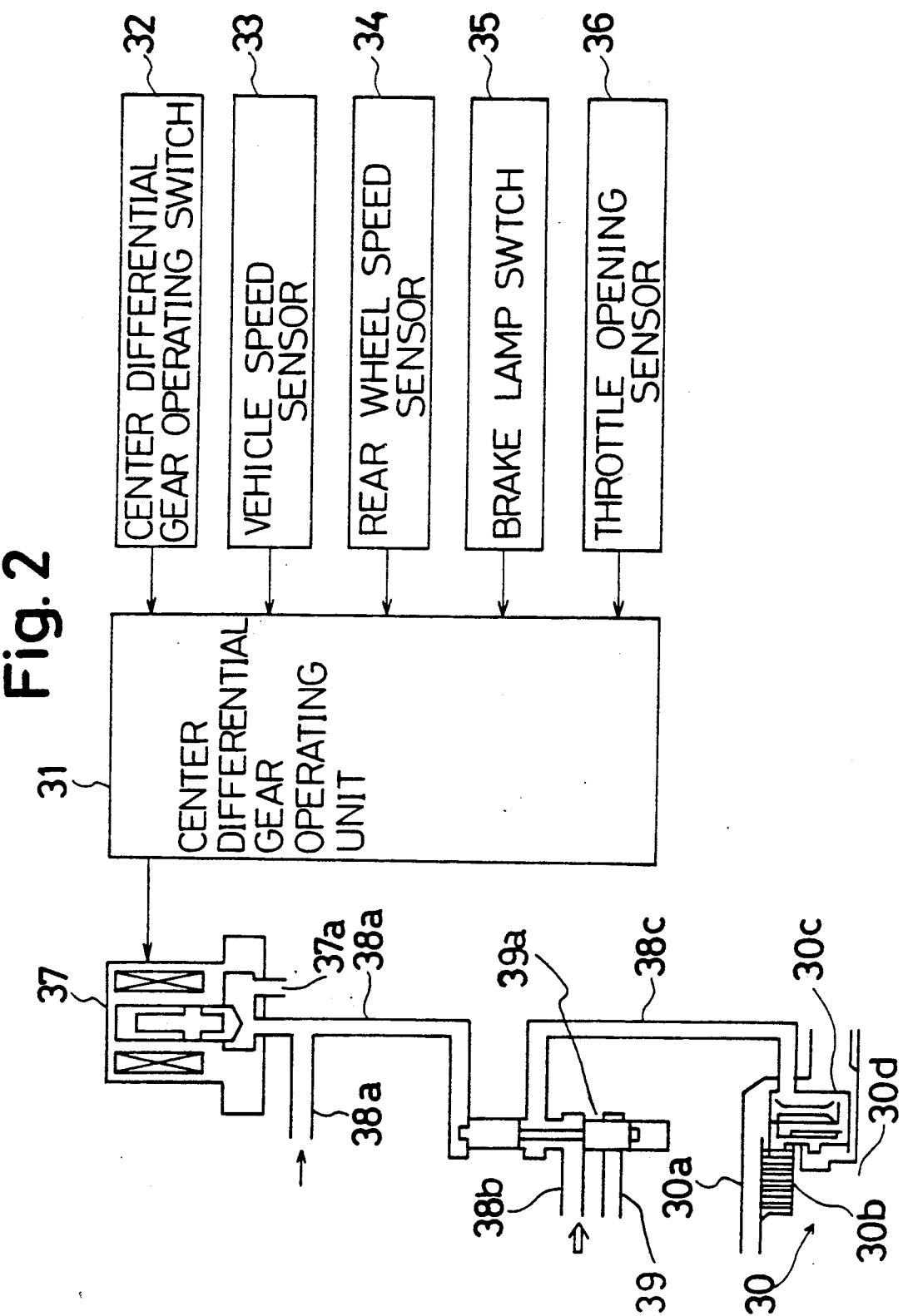
FIG. 2 is a diagram of a control system and hydraulic pressure circuit for controlling the anti-lock brake system for a four wheel drive vehicle.

FIG. 2 is a diagram of a control system and hydraulic pressure circuit for controlling the anti-lock brake system for the four wheel drive vehicle. The center differential lock mechanism 30 is controlled in accordance with a center differential gear operating unit 31 in the form of a microprocessor. A center differential gear operating switch 32, a vehicle speed sensor 33, a rear wheel speed sensor 34, a brake lamp switch 35 and a throttle opening sensor 36 are connected to the center differential gear operating unit 31. The center differential gear operating switch 32 is controlled by a manual operation. In this arrangement electric signals are fed to the center differential gear operating unit 31 from the center differential gear operating switch 32, the vehicle speed sensor 33, the rear wheel speed sensor 34, the brake lamp switch 35 and the throttle opening sensor 36. The center differential gear operating switch 32 determines an operating condition or a non-operating condition of the center differential lock mechanism 30. The vehicle speed sensor 33 detects the present vehicle speed and transforms it into an electric signal. The brake lamp switch operates a brake lamp in accordance with the foot brake condition which is operated by a driver. When the foot brake is operated, the brake lamp turns on and the electric signal is delivered to the center differential gear operating unit 31. The throttle opening sensor 36 measures the opening ratio of the throttle valve and the opening ratio is transformed into an electric signal. The center differential gear operating unit 31 determines the operating condition of the center differential lock mechanism 30 from the input of one or more electric signals.

In the hydraulic pressure circuit for the center differential lock mechanism 30, a solenoid valve 37 is operatively connected to the hydraulic pressure circuit. A drain port 37a is formed in the solenoid valve 37. A plurality of hydraulic pressure conduits 38a, 38b and 38c are provided in the hydraulic pressure circuit. When the solenoid valve 37 is energized, communication between the drain port 37a and the hydraulic pressure conduits is established. On the other hand, when the solenoid valve 37 is de-energized, communication between the drain port 37a and the hydraulic pressure conduits is interrupted. A normally closed type solenoid valve 37 is employed in this embodiment. A shift valve 39 is operatively connected to the hydraulic pressure conduits 38a, 38b and 38c. The shift valve 39 includes a spool 39a. The spool 39a is operated in accordance with the control condition of the solenoid valve 37.

The differential lock mechanism 30 basically includes a ring gear mounting case 30a, a hydraulic clutch 30b, operating means 30c for controlling the hydraulic clutch 30b and an outer housing 30d of the front differential gear 13. The engagement and disengagement of the hydraulic clutch 30b is controlled in accordance with the operation of the operating means 30c.

Figure 3:
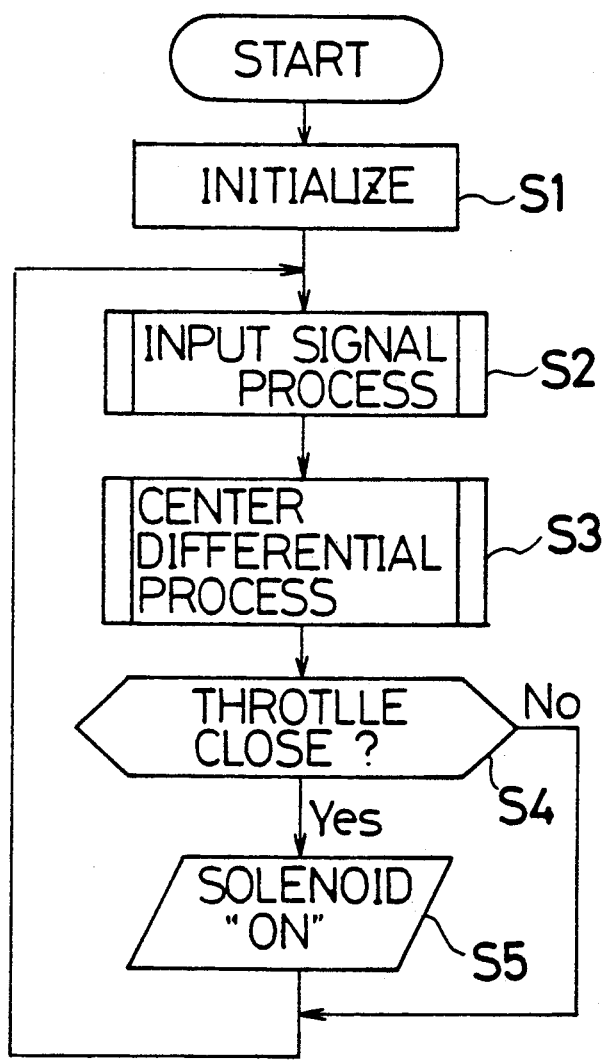
FIG. 3 illustrates a flow chart showing the operation of the center differential lock mechanism.

The operation of this embodiment will now be described by referring to FIGS. 2 and 3. FIG. 3 is a flow chart showing the operation of the center differential lock mechanism.

When the solenoid 37 is in the energized condition as shown in FIG. 2, the pressure conduit 38a communicates with the drain port 37a of the solenoid valve 37. In accordance with the foregoing condition, the spool 39a is located in the upper position as shown. In this operating condition, the pressure conduit 38b and the pressure conduit 38c communicate with each other. Since these conduits 38b and 38c communicate with each other hydraulic pressure is introduced into the operating means 30c. The hydraulic clutch 30b then operates in the engaged condition. The torque is directly transmitted between the ring gear mounting case 30a and the outer housing 30d.

When the solenoid 37 is in the de-energized condition, the communication between the pressure conduit 38a and the drain port 37a is interrupted. In accordance with the foregoing condition, the spool 39a is shifted to a downward position. In this operating condition, the communication between the pressure conduit 38b and the pressure conduit 38c is interrupted. Since these conduits 38b and 38c do not communicate, hydraulic pressure is not introduced into the operating means 30c. The hydraulic clutch 30b is then in the disengaged condition. The torque from the ring gear mounting case 30a is then transmitted to the front differential gear 13 by way of the center differential gear 12.

The center differential gear operating unit is controlled in accordance with the flow chart of FIG. 3 which includes the following steps.

S1 - The state of the output port of the operating unit 31 is set at the initial level.

S2 - The data indicating the state of the center differential gear operating switch 32, the vehicle speed sensor 33, the rear wheel speed sensor 34, the brake lamp switch 35 and the throttle opening sensor 36 are input to the unit 31 to be processed and arranged in accordance with the predetermined function.

S3 - The data from step S2 is processed and the operating condition of the center differential lock mechanism is determined.

S4 - At the moment an inoperative condition or a low degree throttle valve condition of the throttle valve is detected, an "energized" operating signal is supplied to the solenoid valve 37. When the operating condition of the throttle valve is detected, the de-energizing operating signal is supplied to the solenoid valve 37.

S5 - Based on step S4, an "energized" signal is supplied to the solenoid valve.

Figure 4:
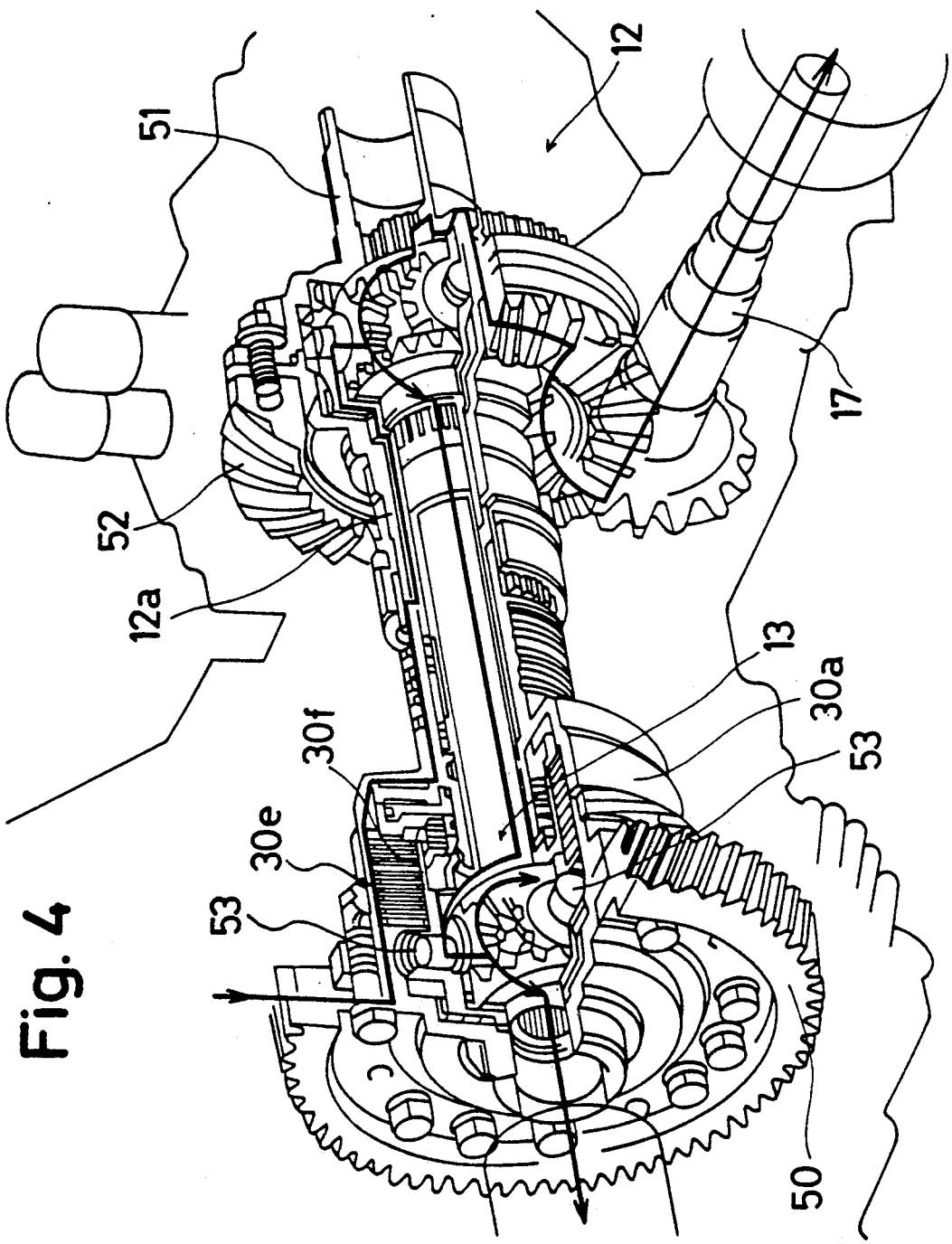
FIG. 4 illustrates a partial cross-sectional perspective view of the center drive train of the center differential gear and the front differential gear.

FIG. 4 illustrates a partial cross-sectional perspective view of the center drive train of the center differential gear and the front differential gear. A ring gear 50 connects with an output portion of the transmission (not shown). The ring rear 50 is rigidly connected to the ring gear mounting case 30a. The ring gear mounting case 30a is operatively connected to an outer casing 12a of the center differential gear 12. A transfer mounting case 51 and a ring shaped transfer drive gear 52 are rigidly connected to the outer casing 12a by means of bolts. The driving shaft 17 is operatively connected to the transfer drive gear 52 to transmit torque to the rear differential gear 14 (not shown in FIG. 4). The outer housing 30d of the front differential gear 13 is operatively connected to the front pinion gears 53.

Under the disengaged condition of the hydraulic clutch 30b the drive force from the transmission is transmitted to the front differential gear 13 by way of the center differential gear 12.

Under the engaged condition of the hydraulic clutch 30b the drive force from the transmission is transmitted to the front differential gear directly. The hydraulic clutch 30b includes a plurality of clutch discs 30e and clutch discs 30f. The clutch discs 30e are splined to the ring gear mounting case 30a. The clutch discs 30f are splined to the outer housing 30d of the front differential gear 13. The engagement and disengagement of the hydraulic clutch 30b are controlled in accordance with the hydraulic pressure supplied to the operating means 30c.

While the invention has been particularly shown and described with reference to preferred embodiments thereof, it will be understood by those in the art that the foregoing and other changes in form and details may be made therein without departing from the spirit and scope of the invention.

What is claimed is:

1. A center differential lock mechanism controlling system for a vehicle having four wheel drive and which is equipped with a front differential gear, a rear differential gear, a center differential gear and an anti-lock brake system, the center differential lock mechanism controlling system comprising:
   a center differential lock mechanism disposed between said front and rear differential gears for locking the center differential gear when the center differential lock mechanism is engaged and for unlocking the center differential gear when the center differential lock mechanism is disengaged;
   a center differential gear operating unit for controlling engagement and disengagement of said center differential lock mechanism;
   a throttle opening sensor, connected to said center differential gear operating unit, for detecting an opening ratio of a throttle valve, and for providing to said center differential gear operating unit an operating condition signal representing the detected opening ratio;
   said center differential gear operating unit including means for automatically disengaging said center differential lock mechanism when the provided operating condition signal represents a predetermined low degree of throttle opening, said means for automatically disengaging said center differential lock mechanism operating independently of the vehicle's speed.

2. A center differential lock mechanism controlling system as set forth in claim 1, wherein said center differential lock mechanism comprises a clutch means.

3. A center differential lock cancellation device for a vehicle including a center differential lock mechanism for locking a center differential which differentiates between a front wheel drive axle for front wheels of the vehicle and a rear wheel drive axle for rear wheels of the vehicle, a center differential gear operating unit for controlling locking of said center differential lock mechanism, and an anti-lock brake unit for preventing locking of the front and rear wheels, said lock cancellation device comprising:
   detecting means for detecting drive power, and for providing a signal which represents the detected drive power; and
   cancel means, for cancelling a lock state of said center differential lock mechanism when said signal represents a predetermined low drive power, said cancel means operating independently of the vehicle's speed.

4. The device defined in claim 3, wherein said detecting means comprises a throttle opening sensor for detecting the drive power.

5. A center differential lock control device for a vehicle including a center differential lock mechanism for locking a center differential which differentiates between a front wheel drive axle for front wheels of the vehicle and a rear wheel drive axle for rear wheels of the vehicle, and an anti-lock brake system for preventing locking of the vehicle's front and rear wheels, comprising:
   sensor means for sensing a plurality of operating conditions of the vehicle, said sensor means including detector means for detecting drive power, and for providing a drive power signal representing the detected drive power; and
   a center differential lock control unit for controlling locking of said center differential condition and for cancelling a lock condition of said center differential lock mechanism when the drive power signal represents a predetermined low drive power regardless of the vehicle's speed.

6. The device defined in claim 5, wherein said detector means comprises a throttle opening sensor for detecting the drive power.

* * * * *